United States Patent
Hassett

(10) Patent No.: US 9,331,897 B2
(45) Date of Patent: May 3, 2016

(54) RECOVERY FROM MULTIPLE FAULTS IN A COMMUNICATIONS NETWORK

(75) Inventor: Brendan Hassett, Loughrea (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 139 days.

(21) Appl. No.: 14/112,807

(22) PCT Filed: Apr. 21, 2011

(86) PCT No.: PCT/EP2011/056452
§ 371 (c)(1),
(2), (4) Date: Feb. 24, 2014

(87) PCT Pub. No.: WO2012/143059
PCT Pub. Date: Oct. 26, 2012

(65) Prior Publication Data
US 2014/0177430 A1 Jun. 26, 2014

(51) Int. Cl.
*H04L 12/24* (2006.01)
(52) U.S. Cl.
CPC ........ *H04L 41/0654* (2013.01); *H04L 41/0609* (2013.01); *H04L 41/0631* (2013.01)
(58) Field of Classification Search
CPC .............. H04L 41/064; H04L 41/0677; H04L 43/0876; H04L 41/0681; H04L 43/16; H04L 41/5009; G05B 23/0248; G06F 2201/86; G06Q 10/06; G01M 99/00
See application file for complete search history.

(56) References Cited

U.S. PATENT DOCUMENTS

| | | | |
|---|---|---|---|
| 2003/0079160 A1* | 4/2003 | McGee et al. | 714/39 |
| 2005/0262397 A1 | 11/2005 | Fitzgerald et al. | |
| 2008/0133288 A1* | 6/2008 | Thibaux et al. | 705/7 |
| 2008/0183855 A1* | 7/2008 | Agarwal et al. | 709/223 |
| 2008/0276128 A1* | 11/2008 | Lin et al. | 714/45 |

(Continued)

FOREIGN PATENT DOCUMENTS

GB          2 404 525 A     2/2005

OTHER PUBLICATIONS

IBM Corporation "Six steps toward assuring service availability and performance" Service management solutions, White Paper, Mar. 2008, XP002640344, 16 pages.

(Continued)

*Primary Examiner* — Jung-Jen Liu
(74) *Attorney, Agent, or Firm* — Rothwell, Figg, Ernst & Manbeck, P.C.

(57) ABSTRACT

A method of recovery from multiple faults in a communications network comprising: a. receiving an alarm signal from each of a plurality of faults in the communications network, each alarm signal comprising a respective alarm descriptor; b. for each alarm signal: i. analyzing the respective alarm descriptor to identify a possible root cause of the alarm signal; ii. providing a root cause metric for the identified possible root cause, the metric being indicative of a difficulty of repairing the respective fault; iii. determining a service impact caused to the communications network by the respective fault; iv. providing a service impact metric indicative of the service impact; v. combining the root cause metric and the service impact metric to generate an alarm metric; c. ranking the alarm signals in dependence on their respective alarm metrics; and d. causing the fault having the highest ranked alarm metric to be repaired first.

15 Claims, 5 Drawing Sheets

(56) References Cited

U.S. PATENT DOCUMENTS

| | | | |
|---|---|---|---|
| 2009/0022056 A1* | 1/2009 | Ninan et al. | 370/238 |
| 2009/0122697 A1* | 5/2009 | Madhyasha et al. | 370/229 |
| 2009/0187555 A1* | 7/2009 | Liu et al. | 707/5 |
| 2009/0292954 A1* | 11/2009 | Jiang et al. | 714/47 |
| 2010/0050023 A1* | 2/2010 | Scarpelli et al. | 714/46 |

OTHER PUBLICATIONS

Technical Specification Group Services and System Aspects, TSGS#48(10)0376, Meeting #48; Seoul, Republic of Korea, Jun. 7-10, 2010; 3GPP TSG-SA5 (Telecom Management), S5-101566; Meeting SA5#71, May 10-14, 2010, Montreal, Canada, 4 pages.

* cited by examiner

RECOVERY FROM MULTIPLE FAULTS IN A COMMUNICATIONS NETWORK

CROSS REFERENCE TO RELATED APPLICATION(S)

This application is a 35 U.S.C. §371 National Phase Entry Application from PCT/EP2011/056452, filed Apr. 21, 2011, designating the United States, the disclosure of which is incorporated herein in its entirety by reference.

TECHNICAL FIELD

The invention relates to a method of recovery from multiple faults in a communications network. The invention further relates to a communications network fault recovery management system.

BACKGROUND

In a communications network, a fault in the network will probably impact the delivery of service to the customers. Therefore, it is typical for the service provider to use a fault reporting system to report the existence of faults in the network. To allow for the fact that several simultaneous faults may exist, it is normal to use a ranking system to prioritize the order in which faults should be resolved. There are several known fault ranking mechanisms which are based upon one or a combination of a ranking determined by equipment supplier and a ranking determined by the network operator. However, these ranking methods are essentially static and do not take into account the dynamics of the operating environment and changes to the network status.

SUMMARY

It is an object to provide an improved method of recovery from multiple faults in a communications network. It is a further object to provide an improved communications network fault recovery management system.

A first aspect of the invention provides a method of recovery from multiple faults in a communications network. The method comprises step a. of receiving an alarm signal from each of a plurality of faults in the communications network. Each alarm signal comprises a respective alarm descriptor. The method further comprises in step b., for each alarm signal:
  i. analysing the respective alarm descriptor to identify a possible root cause of the alarm signal;
  ii. providing a root cause metric for the identified possible root cause, the metric being indicative of a difficulty of repairing the respective fault;
  iii. determining a service impact caused to the communications network by the respective fault;
  iv. providing a service impact metric indicative of the service impact;
  v. combining the root cause metric and the service impact metric to generate an alarm metric.

The method further comprises a step c. of ranking the alarm signals in dependence on their respective alarm metrics and a step d. of causing the fault having the highest ranked alarm metric to be repaired first.

The method may therefore rank alarms in dependence on both the difficulty of repairing the originating fault and the service impact caused to the communications network by the respective fault. The method may therefore rank received alarm signals according to which have the highest alarm metric, so that alarm signals generated by faults which are easier to repair and which have the greatest service impact may be ranked highest and may be repaired first. The method may take into consideration both factors related to the probable cause of the fault and factors related to the service impact of the fault on end-users of the network.

In an embodiment, step i. comprises applying each of a plurality of root cause identification rules to the alarm descriptor. Each said rule has a first rule condition. Step i. further comprises, for each said rule for which the alarm descriptor meets the respective rule condition, obtaining each possible root cause of the alarm signal.

In an embodiment, step i. further comprises providing a rule descriptor for each rule which is met by the alarm descriptor and each possible root cause is obtained by retrieving one or more previously stored root causes from a look-up table or a database for each rule descriptor.

In an embodiment, if a plurality of possible root causes are identified in step i., step ii. comprises obtaining a root cause metric for each said possible root cause, and obtaining a probability for each said possible root cause. Step ii. further comprises calculating an aggregate root cause metric comprising the sum of each said root cause metric multiplied by its respective probability. Step v. comprises combining the aggregate root cause metric and the service impact metric to generate an alarm metric.

The method may therefore take into account historical data relating to previously occurring alarm signals and faults, in the form of the probability, when ranking alarm signals. This means for example, if there are simultaneous faults each having a similar service impact, the fault which is easier to repair may be ranked higher in the alarm list. This is not possible by using static alarm ranking rules.

In an embodiment, each said probability is obtained by analysing the occurrence of previously received alarm signals generated by the same or a similar root cause.

In an embodiment, each root cause metric comprises at least one of an indication of an effort required to repair the fault and a probability of an unsuccessful repair of the fault.

In an embodiment, step iii. comprises further analysing the respective alarm descriptor to identify a portion of the communications network in which the fault is located. A service impact caused to said portion of the communications network by the respective fault is then determined.

In an embodiment, step iii. further comprises providing a network portion descriptor for said identified portion of the communications network. The service impact is determined by applying each of a plurality of service impact assessment rules to the network portion descriptor. Each said rule has a second rule condition. Step iv. comprises, for each said rule for which the network portion descriptor meets the respective second rule condition, at least one service impact metric is obtained.

In an embodiment, if there are a plurality of service impact metrics, step iv. comprises calculating an aggregate service impact metric comprising the sum of each said service impact metric. Step v. comprises combining the root cause metric and the aggregate service impact metric to generate an alarm metric.

In an embodiment, step d. comprises generating and transmitting a first fault repair control signal arranged to cause the fault having the highest ranked alarm metric to be repaired. At least one further fault repair control signal arranged to cause a fault having a subsequently ranked alarm metric to be repaired is subsequently generated and transmitted.

In an embodiment, the method further comprises, for each alarm signal, determining the actual root cause of the alarm signal and modifying the probability of each identified possible root cause in dependence on said actual root cause.

A second aspect of the invention provides a communications network fault recovery management system comprising an alarm signal input, a metric calculation element and fault repair control apparatus. The alarm signal input is arranged to receive an alarm signal from each of a plurality of faults in the communications network. Each alarm signal comprises a respective alarm descriptor. The metric calculation element is arranged to:

i. receive each alarm descriptor;
ii. analyse each alarm descriptor to identify a possible root cause of the respective alarm signal;
iii. provide a root cause metric for the identified possible root cause, the metric being indicative of a difficulty of repairing the respective fault;
iv. determine a service impact caused to the communications network by the respective fault;
v. provide a service impact metric indicative of the service impact;
vi. combine the root cause metric and the service impact metric to generate an alarm metric; and
vii. rank the alarm signals in dependence on their respective alarm metrics; and The fault repair control apparatus is arranged to generate and output a fault repair control signal arranged to cause the fault having the highest ranked alarm metric to be repaired first.

The system may therefore rank alarms in dependence on both the difficulty of repairing the originating fault and the service impact caused to the communications network by the respective fault. The system may therefore rank received alarm signals according to which have the highest alarm metric, so that alarm signals generated by faults which are easier to repair and which have the greatest service impact may be ranked highest and are caused to be repaired first. The system may take into consideration both factors related to the probable cause of the fault and factors related to the service impact of the fault on end-users of the network.

In an embodiment, the metric calculation element is arranged in step ii. to apply each of a plurality of root cause identification rules to the alarm descriptor. Each said rule has a first rule condition. For each said rule for which the alarm descriptor meets the respective rule condition, the metric calculation element is arranged to obtain each possible root cause of the alarm signal.

In an embodiment, the metric calculation element is further arranged to, if a plurality of possible root causes are identified, in step iii. obtain a root cause metric for each said possible root cause, and obtain a probability for each said possible root cause. The metric calculation element is further arranged to in step iii. calculate an aggregate root cause metric comprising the sum of each said root cause metric multiplied by its respective probability. The metric calculation element is further arranged to in step v. combine the aggregate root cause metric and the service impact metric to generate an alarm metric.

In an embodiment, the metric calculation element is further arranged to obtain root cause metrics comprising at least one of an indication of an effort required to repair the fault and a probability of an unsuccessful repair of the fault.

In an embodiment, the metric calculation element is further arranged to in step iii. to further analyse the respective alarm descriptor to identify a portion of the communications network in which the fault is located. The metric calculation element is further arranged to determine a service impact caused to said portion of the communications network by the respective fault.

In an embodiment, the metric calculation element is further arranged to in step iii. provide a network portion descriptor for said identified portion of the communications network. The metric calculation element is further arranged to determine said service impact by applying each of a plurality of service impact assessment rules to the network portion descriptor. Each said rule has a second rule condition. Step iv. comprises, for each said rule for which the network portion descriptor meets the respective second rule condition, at least one service impact metric is obtained.

In an embodiment, the metric calculation element is further arranged to, if there are a plurality of service impact metrics, in step iv. calculate an aggregate service impact metric comprising the sum of each said service impact metric. The metric calculation element is further arranged to in step v. combine the root cause metric and the aggregate service impact metric to generate an alarm metric.

In an embodiment, the fault repair control apparatus is arranged to generate and transmit a first fault repair control signal arranged to cause the fault having the highest ranked alarm metric to be repaired. The fault repair control apparatus is further arranged to subsequently generate and transmit at least one further fault repair control signal arranged to cause a fault having a subsequently ranked alarm metric to be repaired.

In an embodiment, the system is further arranged to, for each alarm signal, receive an actual root cause of the alarm signal and to modify the probability of each identified possible root cause in dependence on said actual root cause.

A third aspect of the invention provides a data carrier having computer readable instructions embodied therein. The said computer readable instructions are for providing access to resources available on a processor. The computer readable instructions comprise instructions to cause the processor to perform any of the above steps of the method of recovery from multiple faults in a communications network as described in any of the above paragraphs.

The invention in its various embodiments allows for handling multiple faults in the network in a way that minimises disruption to operation of the network or its part, which is very important to the operator of the network. This beneficial effect is achieved by ranking the alarms in terms which are most relevant for an operator and combining factors related to the probable cause of the fault with factors related to the end-user impact of the fault. Furthermore, the advantage over known solutions is that the invention in its embodiments uses recent historical data as a basis for the ranking. This means for example, that if there are similar simultaneous faults in two neighbourhoods, the area which represents the higher number of impacted subscribers could be ranked higher in the alarm list. This is not possible by using the known static alarm ranking rules.

Embodiments of the invention will now be described, by way of example only, with reference to the accompanying drawings.

DETAILED DESCRIPTION

Figure 1:
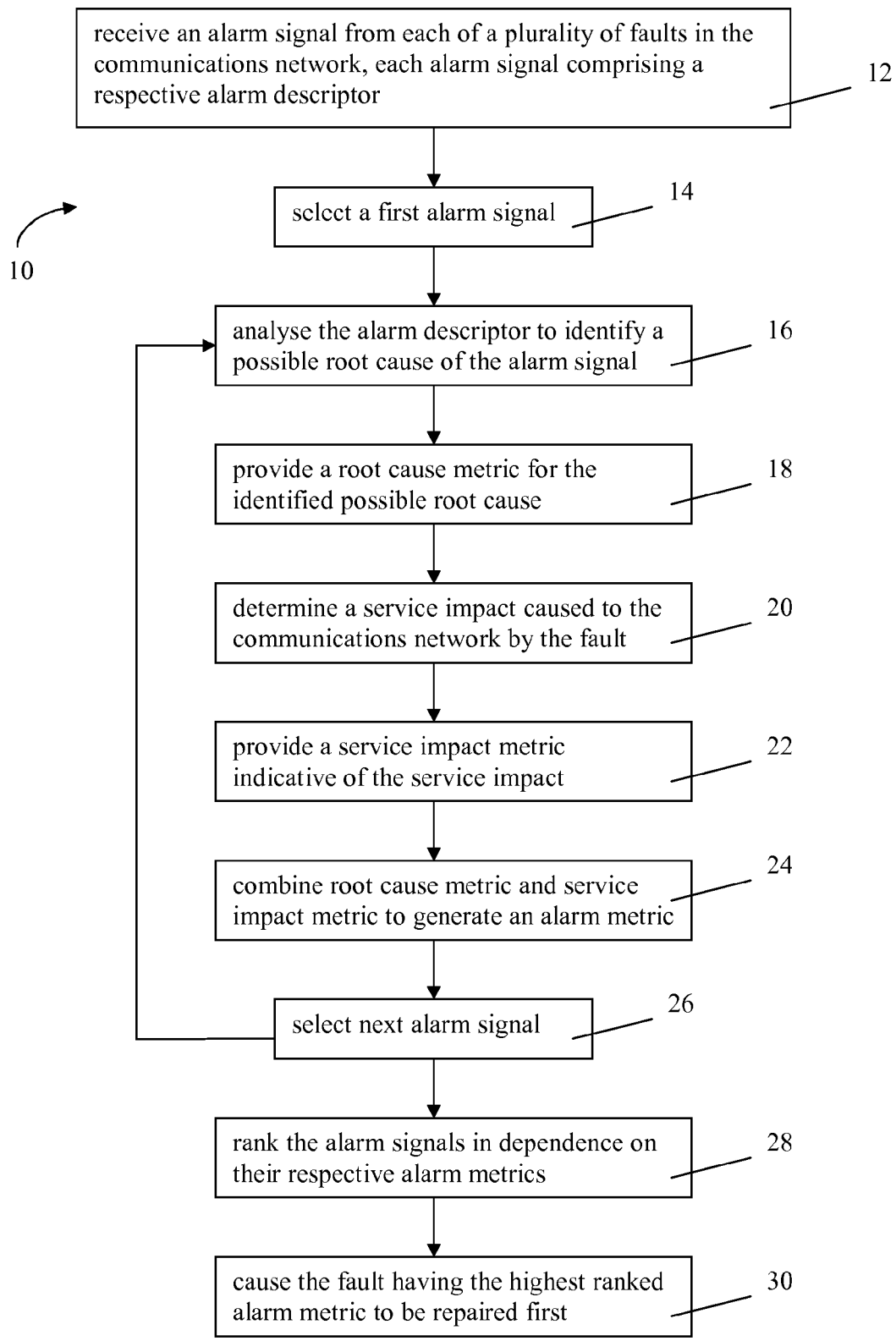
FIG. 1 shows the steps of a method of recovery from multiple faults in a communications network according to a first embodiment of the invention.

A first embodiment of the invention provides a method 10 of recovery from multiple faults in a communications network having the steps shown in FIG. 1.

The method 10 comprises receiving an alarm signal from each of a plurality of faults in the communications network 12. Each alarm signal comprises a respective alarm descriptor. In a step i. of the method, the respective alarm descriptor of each alarm signal is analysed to identify a possible root cause of the alarm signal 14. Once a possible root cause is identified for an alarm signal the method comprises a step ii. in which a root cause metric for the identified possible root cause 16 is provided. The metric is indicative of a difficulty of repairing the respective fault.

For each alarm signal, the method 10 further comprises a step iii. in which a service impact caused to the communications network by the respective fault 20 is determined and a service impact metric indicative of the service impact 22 is provided. The root cause metric and the service impact metric of each alarm signal are then combined 24 in a step iv. to generate an alarm metric for the respective alarm signal.

The identification of a possible root cause 14, provision of a root cause metric 16, determination of a service impact 20, provision of a service impact metric 22 and generation of an alarm metric 24 is repeated 26, for each received alarm signal.

The method 10 further comprises ranking the alarm signals in dependence on their respective alarm metrics 28 and causing the fault having the highest ranked alarm metric to be repaired first 30.

Figure 2:
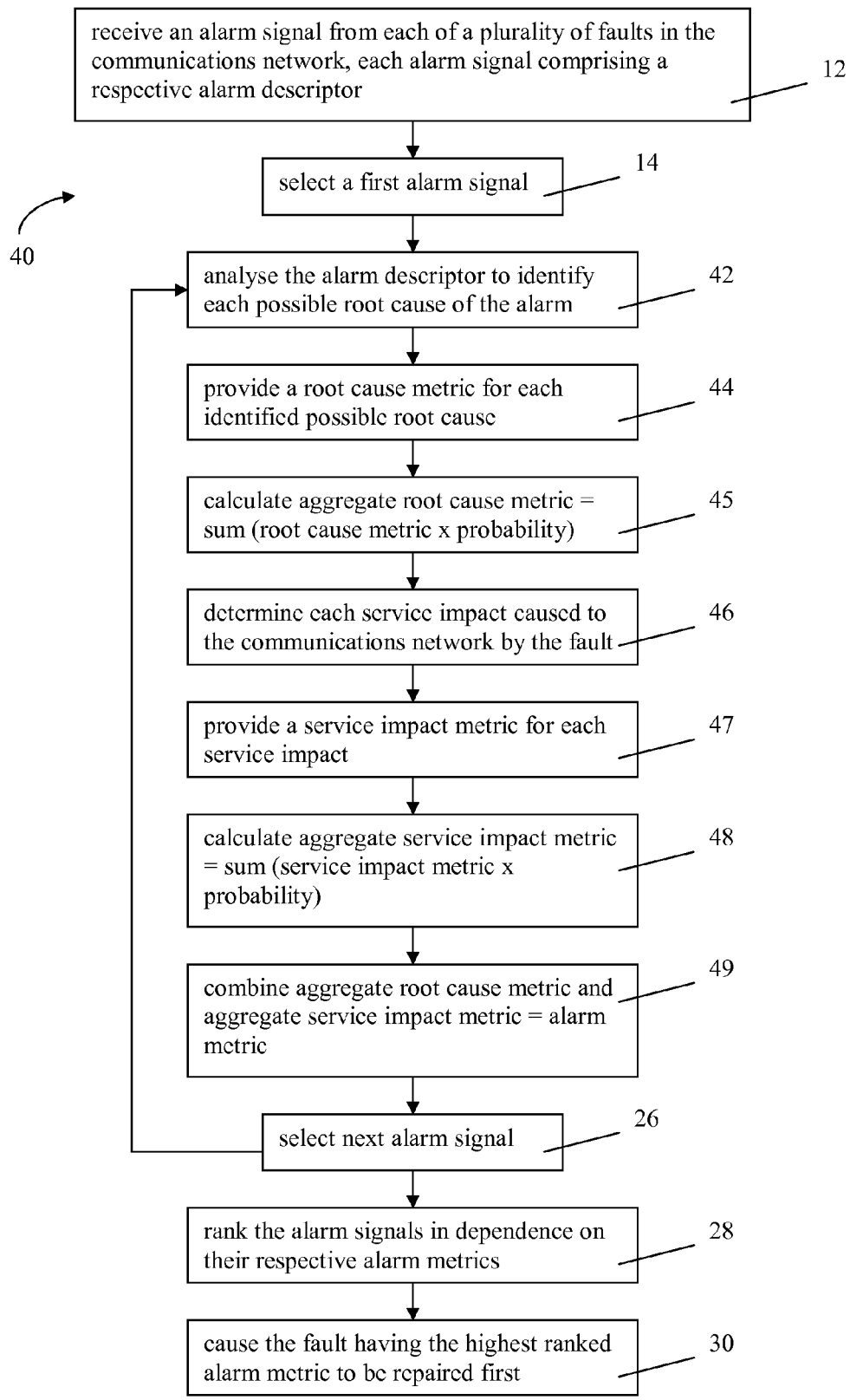
FIG. 2 shows the steps of a method of recovery from multiple faults in a communications network according to a second embodiment of the invention.

A second embodiment of the invention provides a method 40 of recovery from multiple faults in a communications network, having the steps shown in FIG. 2. The method 40 of this embodiment is similar to the method 10 shown in FIG. 1 and the same reference numbers are retained for corresponding steps.

In this embodiment, the alarm descriptor of each alarm signal is analysed to identify each possible root cause of the alarm 42. The analysis of the alarm descriptor may identify more than one possible root cause of an alarm signal. A root cause metric is provided for each identified possible root cause 44 and an aggregate root cause metric is calculated 45 which takes account of each possible root cause and its relative probability. The aggregate root cause is given by the sum of each individual root cause metric multiplied by its respective probability 45. The method 40 of this embodiment therefore provides a root cause metric which is indicative of the difficulty of repairing the fault which generated the alarm signal which takes into account the difficulty of repair of each identified possible root cause, together with the relative probabilities of each identified possible root cause.

Each service impact caused by the fault originating a respective alarm signal is determined 46 and a service impact metric is provided for each service impact 47. An aggregate service impact metric is calculated 48 which takes account of each service impact and its relative probability. The aggregate service impact metric is given by the sum of each individual service impact metric multiplied by its respective probability 48. The method 40 of this embodiment therefore provides a service impact metric which is indicative of each service impact caused to the network by the fault which generated the alarm signal which takes into account the difficulty of repair of each identified possible root cause, together with the relative probabilities of each identified possible root cause.

The aggregate root cause metric is combined with the aggregate service impact metric to generate an alarm metric 49 for the respective alarm signal.

Figure 3:
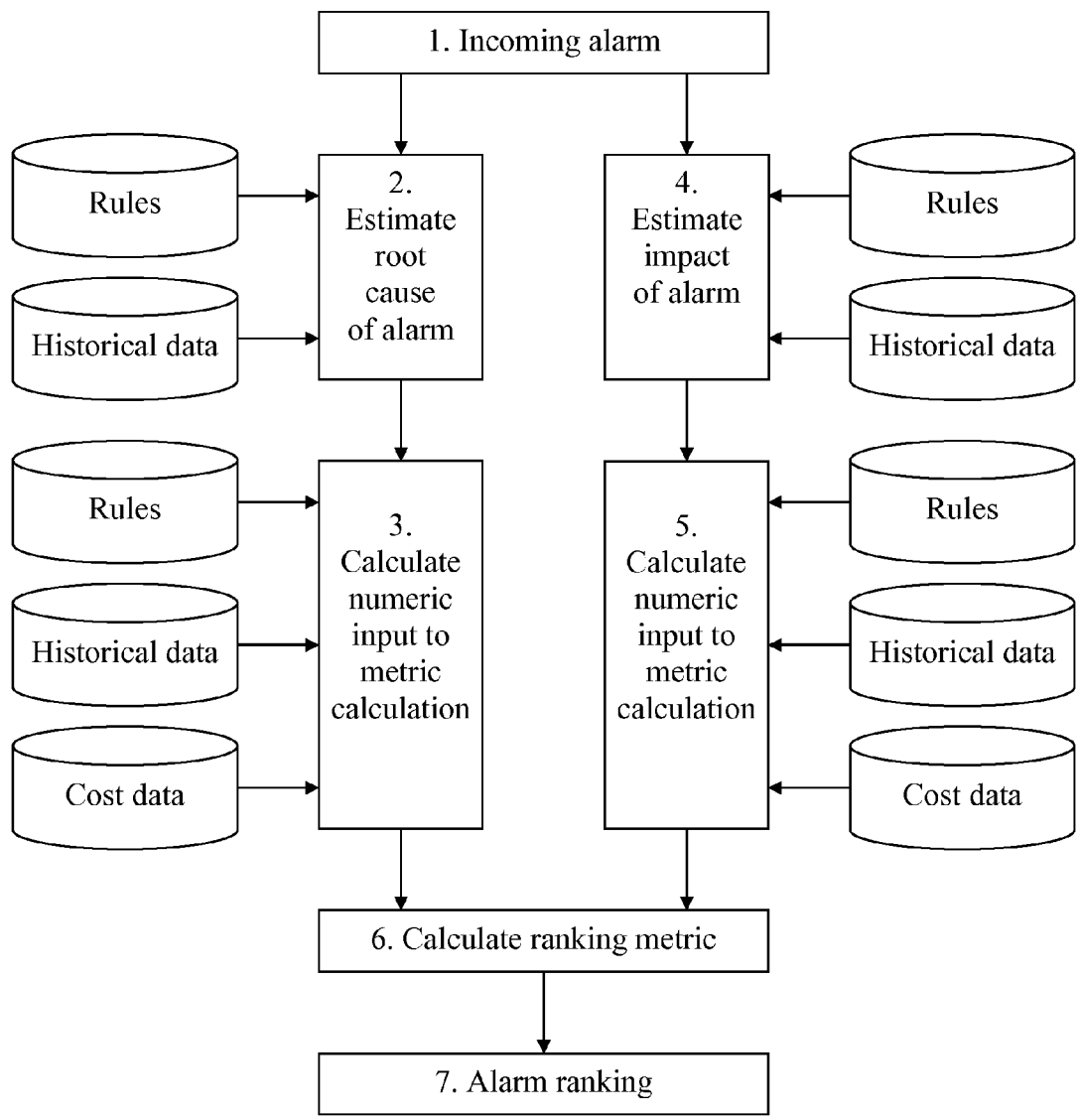
FIG. 3 shows the steps of a method of recovery from multiple faults in a communications network according to a third embodiment of the invention.

The steps of a method 50 of recovery from multiple faults in a communications network are shown in FIG. 3. The method 50 of this embodiment is similar to the method 40 of FIG. 2 and the same reference numbers are retained for corresponding steps.

In this embodiment, step i. comprises analysing the alarm descriptor to identify each possible root cause of the alarm signal 52. This is done by applying each of a first plurality of root cause identification rules 54, each having a respective first rule condition, to the alarm descriptor. For each rule for which the alarm descriptor meets the respective rule condition, the method 50 comprises obtaining each possible root cause of the alarm signal. This is done by retrieving from a look up table or database one or more previously stored possible root causes for each rule that has been met. The probability 56 of each possible root cause is also retrieved. The probability is calculated using historical data relating to actual identified root causes for previously received alarm descriptors and the outcome of previously carried out root cause analysis of similar alarm signals. The probability calculation therefore takes account of other recent alarm signals which may indicate the same actual root cause.

Step i. therefore comprises analysing the alarm descriptor to identify each possible root cause of the alarm signal by:
Applying pre-defined rules
Analysis of other recent alarms which may indicate the same actual cause
Analysis of previous root-cause analysis of similar alarms Step ii. of this embodiment comprises providing an aggregate root cause metric indicative of the difficulty of repairing the respective fault 58. This is done by obtaining an individual root cause metric for each identified possible root cause and calculating the aggregate root cause metric as the sum of each individual root cause metric multiplied by its respective probability.

Each individual root cause metric is obtained by applying each of a second plurality of pre-defined rules 60 to the alarm descriptor, each rule having a second rule condition.

For each rule for which the alarm descriptor meets the respective second rule condition one or more root cause metrics are obtained. The root cause metric is obtained by analysis of similar recent repairs based on historical data 52 and analysis of various cost data, including the cost of materials required to effect a repair, cost of labour, allocations of resources such as technical experts, diagnostic equipment and transport equipment, and difficulty of accessing the site of the fault. The resulting root cause metric therefore takes account of both costs, such as time required to effect the repair, number of man hours required to effect the repair and the availability of the necessary resources required to effect the repair. Analysis of the historical data relating to similar recent repairs enables a probability to be provided that the repair will be unsuccessful. The probability of unsuccessful repair is also accounted for in the root cause metric.

Step ii. therefore comprises analysing the alarm descriptor to obtain a root cause metric which represents the estimated effort required to repair the fault. In this embodiment the root cause metric is obtained by:
- Applying further pre-defined rules
- Analysis of similar recent repairs
- Considering the cost of materials and labour to effect repair of the fault.

Step ii. considers the cost of materials, cost of labour, allocation of limited resources (experts, diagnostic equipment, transport equipment) and difficulty of access to the faulty site. The resulting root cause metric may therefore represent the difficulty of effecting a repair taking account of one or more of:
- Time needed for repair
- Manhours required
- Availability of resources
- Probability of unsuccessful repair Step iii. comprises further analysing the respective alarm descriptor to identify a portion of the communications network in which the fault is located and providing a network portion descriptor for the identified portion of the network. Each of a third plurality of service impact assessment rules 68 are applied to the alarm descriptor to identify the affected network portion. Each rule has a third rule condition. For the rule for which the alarm descriptor meets the respective third rule condition a network portion descriptor is obtained. This done by looking up in a table or database the network portion descriptor relating to the met rule. The identification of the relevant portion of the network affected by alarm signals meeting each rule is obtained by analysis of previous alarm signals of similar faults 70.

Step iii. therefore determines the service impact of the fault giving rise to a respective alarm signal by:
- Applying pre-defined rules
- Analysis of previous analyses of the alarm descriptors of similar faults.

In step iv., a service impact metric for the identified portion of the network is determined by applying each of a fourth plurality of service impact assessment rules 74 to the network portion descriptor. Each rule has a fourth rule condition. For each rule for which the network portion descriptor meets the fourth rule condition one or more service impact metrics are obtained. This done by looking up in a table or database the service impact metric relating to the respective network portion.

Each service impact metric is obtained by analysis of traffic load based on historical data 76, including number of subscribers, number of voice calls, and volume of data traffic in the identified portion of the network. Analysis of various cost data 78 is also considered in obtaining each service impact metric, including recent revenue received from customers within the affected network portion to determine a level of financial revenue reduction which may be experienced by the network operators as a result of the fault in the identified portion of the network, loss of goodwill and risks related to redundancy in the communications network.

Each service impact metric also takes the following into account:
- Number of affected customers
- Grade of affected customers
- Load level on the network
- Probability of worsening situation.

The method 50 of this embodiment further comprises calculating an alarm metric by combining the aggregate root cause metric and the aggregate service impact metric to generate an alarm metric for an alarm signal 80. The root cause metric and the service impact metric may be combined by dividing the service impact metric with the root cause metric, to generate a benefit/effort ratio as the alarm metric. For example, where the root cause metric may indicate the difficulty of repairing the fault by determining the number of engineers required to repair the fault and the service impact metric may determine the number of customers within the affected network portion. In this case, the alarm metric calculates a ratio which represents the number of customers who will have their service restored for each engineer required to repair the fault. As a further example, the root cause metric may indicate the difficulty of repairing the fault as a probability of unsuccessful repair and the service impact metric may represent the service impact caused to the communications network as a probability that the service within the network will be impaired if a fault is not repaired. The alarm metric is calculated as a ratio of the probability of service impairment to probability of unsuccessful repair which represents a relative risk level of repairing the fault. As a further example, the root cause analysis may indicate the difficulty of repairing the fault in terms of the manpower required to repair the fault and the service impact metric may indicate the service impact cause to the communications network in the terms of the traffic load level carried by the affected part of the network. The alarm metric in this example comprises a ratio of the load to the man hours which represents the effectiveness of allocating manpower to repairing the fault. As a further example, the root cause metric may indicate the difficulty of repairing the fault as a probability of repairing the fault and the service impact metric may indicate the service impact caused to the communications network in terms of the revenue which will be lost by network operator as a result of the ongoing fault. In this example, the alarm metric comprises the product of the root cause metric and the service impact metric.

The alarms are then ranked in dependence on their respective alarm metrics 28. In this embodiment alarms are ranked against each other such that alarms with a high benefit/effort ratio are ranked above alarms with a low benefit/effort ratio.

The method then comprises causing the fault having the highest ranked alarm metric to be repaired first. In this example this is effected by generating and transmitting a first fault repair control signal arranged to cause the fault having the highest ranked alarm metric to be repaired 82. Further fault repair control signals are subsequently generated and transmitted for subsequently ranked alarm metrics. Each fault repair control signal may comprise a control signal arranged to cause apparatus at the fault location to repair the fault. A repair control signal may alternatively comprise an engineer call signal arranged to provide the relevant information regarding the root cause and location of the fault to be repaired, to cause an engineer to attend the fault site and to repair the fault in accordance with the provided information.

Figure 4:
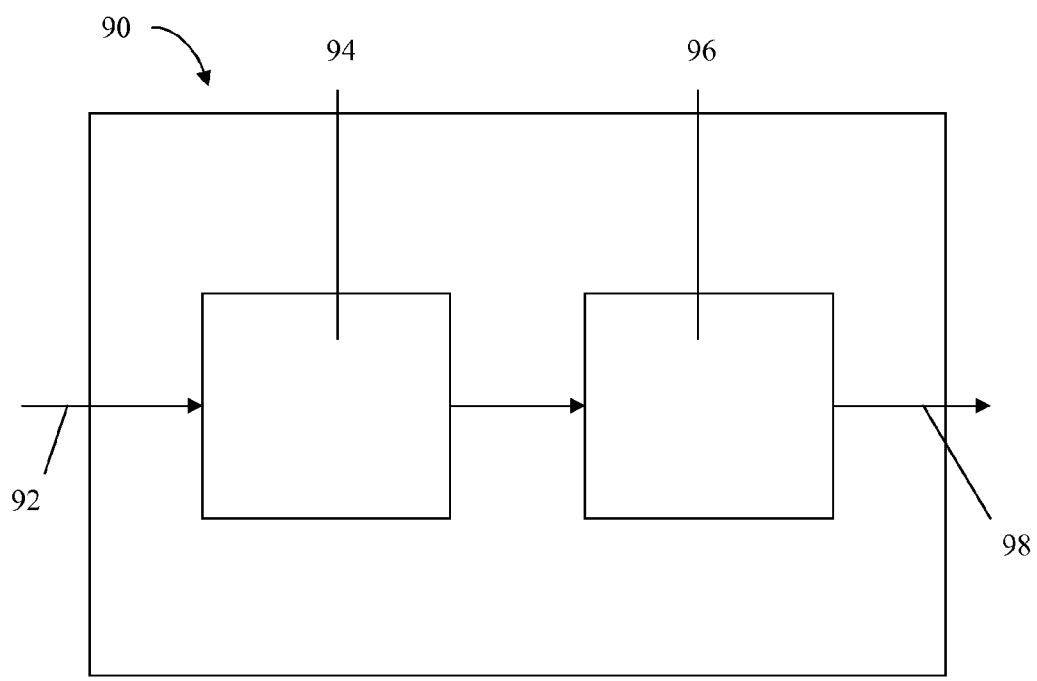
FIG. 4 is a schematic representation of a communications network fault recovery management system according to a fourth embodiment of the invention.

A fourth embodiment of the invention provides a communications network fault recovery management system 90 as shown in FIG. 4. The fault recovery management system comprises an alarm signal input 92, a metric calculation element 94, and fault repair control apparatus 96.

The alarm signal input 92 is arranged to receive an alarm signal from each of a plurality of faults in the communications network. The alarm signal input 92 is arranged to be coupled to the communications network to receive the alarm signals. Each alarm signal comprises a respective alarm descriptor.

The metric calculation element 94 is arranged to:
i. receive each alarm descriptor;
ii. analyse each alarm descriptor to identify a possible root cause of the respective alarm signal;

iii. provide a root cause metric for the identified possible root cause, the metric being indicative of a difficulty of repairing the respective fault;
iv. determine a service impact caused to the communications network by the respective fault;
v. provide a service impact metric indicative of the service impact;
vi. combine the root cause metric and the service impact metric to generate an alarm metric; and
vii. rank the alarm signals in dependence on their respective alarm metrics.

The fault repair control apparatus 96 is arranged to generate an output of fault repair control signal 98. The control signal 98 is arranged to cause the fault having the highest ranked alarm metric to be repaired first.

Figure 5:
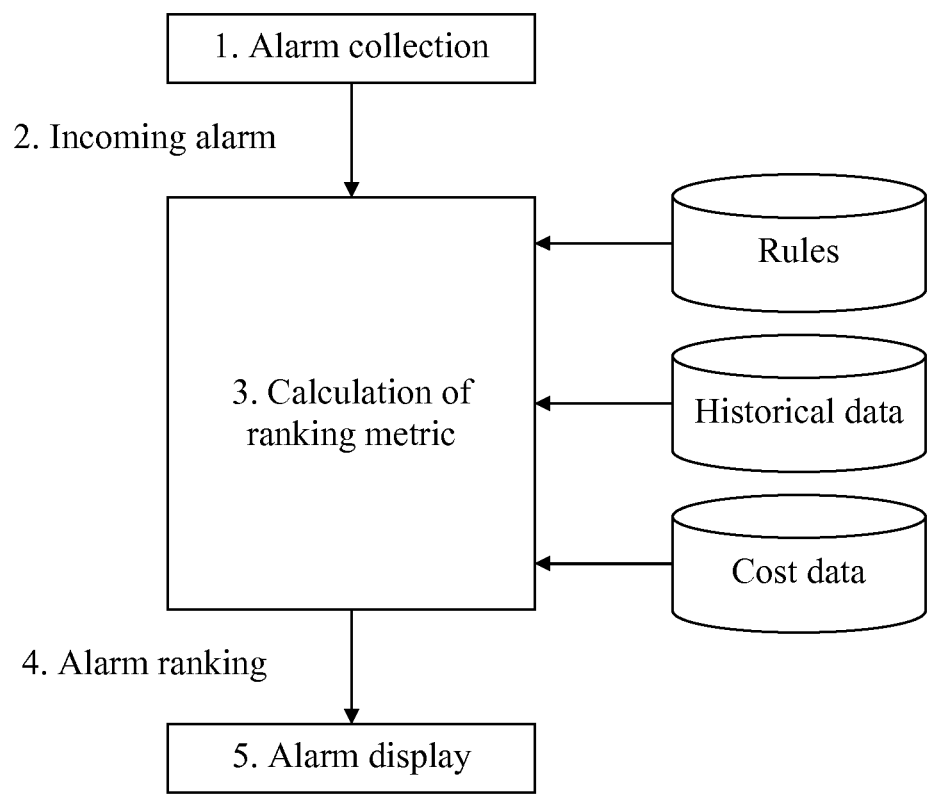
FIG. 5 is a schematic representation of a communications network fault recovery management system according to a fifth embodiment of the invention.

FIG. 5 shows a communications network fault recovery management system 100 according to a fifth embodiment of the invention. The system 100 of this embodiment is similar to the fault recovering management system 90 of FIG. 4, with the following modifications. The same reference numbers are retained for corresponding features.

In this embodiment, the system 100 further comprises an alarm collection element 102 arranged to collect alarm signals from the communications network. The alarm collection element 102 is further arranged to read the alarm descriptor of each alarm signal and to generate and transmit an alarm descriptor signal 104 to the metric calculation element. In this example the metric calculation element is arranged to implement the steps of the method of recovery from multiple faults in a communications network as shown in FIG. 3. The metric calculation element is arranged to generate and transmit an alarm ranking signal 106 to the fault repair control apparatus 108. In this example the fault repair control apparatus 108 is additionally arranged to display each alarm descriptor according to their alarm metric ranking.

The invention claimed is:

1. A method of recovery from multiple faults in a communications network, the method comprising:
   a. receiving an alarm signal from each of a plurality of faults in the communications network, each alarm signal comprising a respective alarm descriptor;
   b. for each alarm signal received:
      i. analyzing the respective alarm descriptor to identify a possible root cause of the alarm signal;
      ii. providing a root cause metric for the identified possible root cause, the metric comprising a probability value indicating a probability of unsuccessful repair of the respective fault;
      iii. determining a service impact caused to the communications network by the respective fault;
      iv. providing a service impact metric indicative of the service impact; and
      v. combining the root cause metric and the service impact metric to generate an alarm metric;
   c. ranking the alarm signals in dependence on their respective alarm metrics; and
   d. causing the fault having the highest ranked alarm metric to be repaired first.

2. The method as claimed in claim 1, wherein step i. comprises:
   applying each of a plurality of root cause identification rules to the respective alarm descriptor, each said rule having a first rule condition; and
   for each said rule for which the alarm descriptor meets the respective first rule condition, obtaining each possible root cause of the alarm signal.

3. The method as claimed in claim 1, wherein if a plurality of possible root causes are identified in step i., step ii. comprises obtaining a root cause metric for each said possible root cause, obtaining a probability for each said possible root cause, and calculating an aggregate root cause metric comprising the sum of each said root cause metric multiplied by its respective probability, and step v. comprises combining the aggregate root cause metric and the service impact metric to generate an alarm metric.

4. The method as claimed in claim 1, wherein each root cause metric further comprises an indication of an effort required to repair the fault.

5. The method as claimed in claim 1, wherein step iii. comprises further analysing the respective alarm descriptor to identify a portion of the communications network in which the fault is located and determining a service impact caused to said portion of the communications network by the respective fault.

6. The method as claimed in claim 5, wherein step iii. further comprises providing a network portion descriptor for said identified portion of the communications network and the service impact is determined by:
   applying each of a plurality of service impact assessment rules to the network portion descriptor, each said rule having a second rule condition and step iv. comprises, for each said rule for which the network portion descriptor meets the respective second rule condition, obtaining at least one service impact metric.

7. The method as claimed in claim 6, wherein if there are a plurality of service impact metrics, step iv. comprises calculating an aggregate service impact metric comprising the sum of each said service impact metric, and step v. comprises combining the root cause metric and the aggregate service impact metric to generate an alarm metric.

8. The method as claimed in claim 1, wherein step d. comprises generating and transmitting a first fault repair control signal arranged to cause the fault having the highest ranked alarm metric to be repaired and subsequently sequentially generating and transmitting at least one further fault repair control signal arranged to cause a fault having a subsequently ranked alarm metric to be repaired.

9. The method as claimed in claim 1, wherein the method further comprises, for each alarm signal received, determining the actual root cause of the alarm signal and modifying a probability of each identified possible root cause in dependence on said actual root cause.

10. The method as claimed in claim 1, wherein the root cause metric is further based on one or more of: (i) time needed for repair, (ii) manhours required, and (iii) availability of resources.

11. The method as claimed in claim 1, wherein the service impact metric is based on: (i) number of affected customers, and (ii) grade of affected customers.

12. The method as claimed in claim 1, wherein the alarm metric equals the service impact metric divided by the root cause metric.

13. The method as claimed in claim 12, wherein the service impact metric represents a probability that service within the communications network will be impaired if the service is not repaired.

14. A communications network fault recovery management system comprising:
   an alarm signal input configured to receive an alarm signal from each of a plurality of faults in the communications network, each alarm signal comprising a respective alarm descriptor;

a metric calculation element configured to:
  i. receive each alarm descriptor;
  ii. analyze each alarm descriptor to identify a possible root cause of the respective alarm signal;
  iii. provide a root cause metric for the identified possible root cause, the metric comprising a probability value indicating a probability of unsuccessful repair of the respective fault;
  iv. determine a service impact caused to the communications network by the respective fault;
  v. provide a service impact metric indicative of the service impact;
  vi. combine the root cause metric and the service impact metric to generate an alarm metric; and
  vii. rank the alarm signals in dependence on their respective alarm metrics; and
a fault repair control apparatus configured to generate and output a fault repair control signal configured to cause the fault having the highest ranked alarm metric to be repaired first.

15. A non-transitory data carrier having computer readable instructions embodied therein for providing access to resources available on a processor, the computer readable instructions comprising instructions to cause the processor to perform a method of recovery from multiple faults in a communications network, wherein the instructions cause the processor to:
  a. receive an alarm signal from each of a plurality of faults in the communications network, each alarm signal comprising a respective alarm descriptor;
  b. for each alarm signal received:
    i. analyze the respective alarm descriptor to identify a possible root cause of the alarm signal;
    ii. provide a root cause metric for the identified possible root cause, the metric comprising a probability value indicating a probability of unsuccessful repair of the respective fault;
    iii. determine a service impact caused to the communications network by the respective fault;
    iv. provide a service impact metric indicative of the service impact; and
    v. combine the root cause metric and the service impact metric to generate an alarm metric;
  c. rank the alarm signals in dependence on their respective alarm metrics; and
  d. cause the fault having the highest ranked alarm metric to be repaired first.

* * * * *